United States Patent [19]

Pugliese et al.

[11] 4,447,789

[45] May 8, 1984

[54] LASER AMPLIFIER

[75] Inventors: Vincent Pugliese, Vincennes; Jean-Claude Farcy, Bris-sous-Forges, both of France

[73] Assignee: Compagnie General d'Electricite, Paris, France

[21] Appl. No.: 472,912

[22] Filed: Mar. 8, 1983

Related U.S. Application Data

[63] Continuation of Ser. No. 244,561, Mar. 17, 1981.

[30] Foreign Application Priority Data

Mar. 21, 1980 [FR] France ................................ 80 06354

[51] Int. Cl.³ ................................................ H01S 3/09
[52] U.S. Cl. ....................................... 330/4.3; 367/86; 367/88; 315/111.81; 315/111.91

[56] References Cited

U.S. PATENT DOCUMENTS

| | | | |
|---|---|---|---|
| 3,262,070 | 7/1966 | Reuter et al. | 372/88 |
| 3,334,396 | 8/1967 | Maeda et al. | 29/620 |
| 3,614,663 | 10/1971 | Palanos | 331/94.5 |
| 3,828,277 | 8/1974 | Otto et al. | 372/308 |
| 4,057,707 | 11/1977 | Allen | 338/308 |
| 4,210,877 | 7/1980 | Pleasance et al. | 372/87 |
| 4,278,875 | 7/1981 | Bain | 338/309 |
| 4,292,600 | 9/1981 | Neracher | 372/87 |
| 4,294,648 | 10/1981 | Brede et al. | 338/308 |
| 4,340,508 | 7/1982 | Wahlers et al. | 338/308 |
| 4,380,078 | 4/1983 | Wany et al. | 372/87 |

FOREIGN PATENT DOCUMENTS

| | | | |
|---|---|---|---|
| 283504 | 10/1966 | Australia | 338/308 |
| 676509 | 12/1963 | Canada | 338/308 |
| 1490044 | 9/1969 | Fed. Rep. of Germany . | |
| 870010 | 2/1942 | France | 338/308 |
| 806190 | 12/1958 | United Kingdom | 338/308 |

OTHER PUBLICATIONS

Beverly et al., "Surface Discharge . . . Excitation", 6/10/76 and 10/29/76 respectively, pp. 1–40 and 1–70, ERDA W-7405-ENG-92 Task 81.
Basov, "Iodine Laser . . . Duration,", 6/74, p. 524, *Sov. J. Quant. Electron,* vol. 3, #6.
Soviet Journal of Quantum Electronics, vol. 4, Nr. 9, Mar. 1975, pp. 1138–1140, p. 1140, left column, lines 6–11.
Optics Communications, vol. 18, Nr. 1, Jul. 1976, p. 167, left Column.
Soviet Journal of Quantum Electronics, vol. 6, Nr. 8, Aug. 1976, pp. 998–999.
Soviet Journal of Quantum Electronics, vol. 9, Nr. 6, Jun. 1979, pp. 751–753, p. 751, left Column, Lines 15–24.

*Primary Examiner*—Nelson Moskowitz
*Attorney, Agent, or Firm*—Sughrue, Mion, Zinn, Macpeak, and Seas

[57] ABSTRACT

The amplifier has a fluid active medium and contained in housing (1). The medium is excited by electric discharge in a resistance (4) constituted by a conductive layer deposited on an insulating support.

Application to iodine lasers.

8 Claims, 3 Drawing Figures

LASER AMPLIFIER

This application is a continuation of application Ser. No. 244,561 filed Mar. 17, 1981

The present invention relates to a laser amplifier, and more particularly to a laser amplifier which includes an active medium that is fluid, (i.e. gas or liquid).

BACKGROUND OF THE INVENTION

A iodine laser amplifier is known which has a gas active medium constituted by an iodized gas and means for exciting the active medium. Said means includes xenon flash tubes which can actually be disposed within the active medium. When an electric discharge is triggered in the flash tubes, ultra-violet radiation is emitted which excites the active medium. The disadvantage of such an amplifier is that it is very complex and fairly expensive, in particular when the light beam to be amplified is of large cross-section. Indeed, it then requires many flash tubes and this is expensive.

To reduce the complexity and the production cost of such amplifiers, flash tubes can be replaced by metal filaments which disintegrate at each discharge. It is then necessary to replace these filaments after each laser pulse. This is a particular disadvantage for a case where the filaments are situated in the same chamber as the medium, since the amplifier must then be emptied of gas before the filaments can be replaced.

Preferred embodiments of the present invention mitigate these drawbacks and provide a laser amplifier including means for excitation by ultra-violet radiation, which means are not very expensive and are relatively reliable.

SUMMARY OF THE INVENTION

The present invention provides a laser amplifier which includes a fluid active medium, at least one electric resistance and a generator connected to the resistance to deliver an electric discharge current through said resistance, said current being sufficiently high to produce ultra-violet radiation around said resistance, which radiation is capable of exciting the active medium, wherein said electric resistance comprises an insulating support and a layer of conductive material deposited on the support, two portions of said layer being connected to outputs from the generator, said layer withstanding the electric discharge current without being destroyed.

BRIEF DESCRIPTION OF THE DRAWINGS

Particular embodiments of the present invention are described by way of example with reference to the accompanying drawings in which.

DESCRIPTION OF PREFERRED EMBODIMENTS

Figure 1:
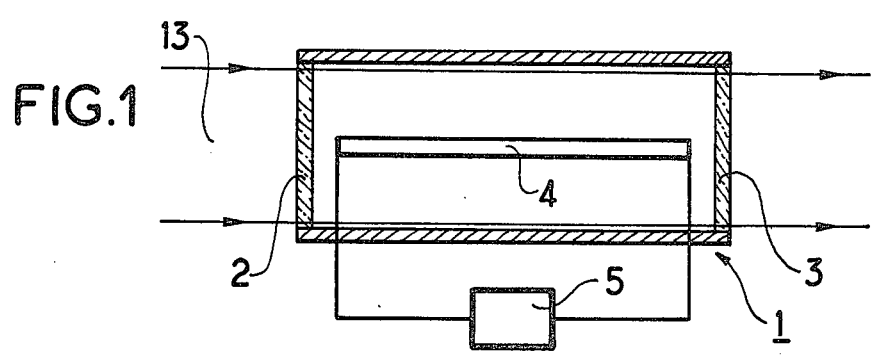
FIG. 1 is a schematic illustration showing an embodiment of a laser amplifier in accordance with the invention, the chamber of this amplifier being illustrated in a longitudinal cross-section.

FIG. 1 illustrates a cylindrical chamber 1 with two opposite surfaces constituted by windows 2 and 3 which are transparent at a wavelength of 1.315 microns. The chamber 1 contains an iodized gas such as hepta-fluoro-iodo-propane $C_3F_7I$. An electric resistance 4 connected to an electric current supply 5 is disposed inside the cylindrical chamber 1 and extends along the axis thereof.

Figure 2:
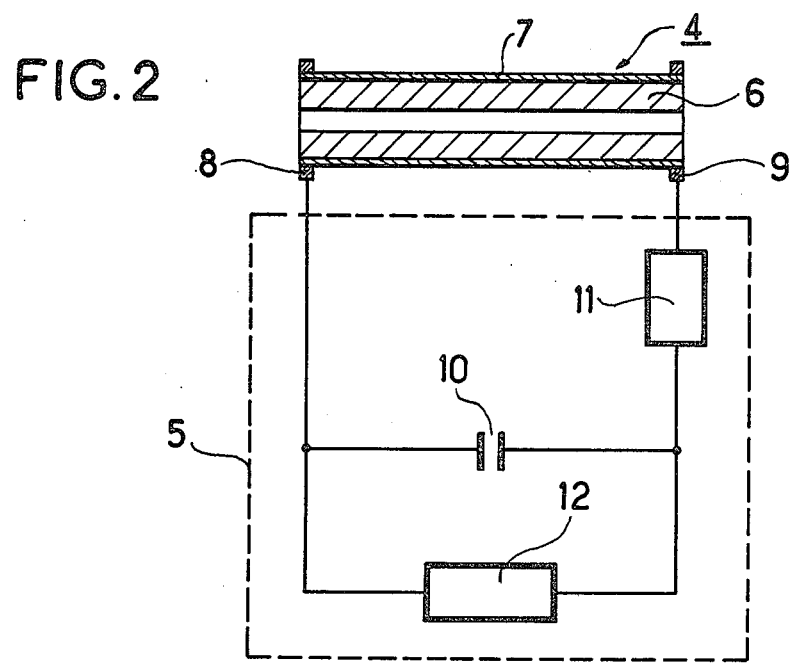
FIG. 2 is a longitudinal cross-section of the electric resistance which forms part of the amplifier in FIG. 1, this resistance being shown connected to its associated electricity supply.

As illustrated in FIG. 2, the resistance 4 has an insulating support such as a cylindrical tube 6 whose outer cylindrical surface is coated with a conductive layer 7. The tube 6 can be constituted by a ceramic substance, e.g. alumina.

The conductive layer 7 is a conductive material which can be deposited on the insulating tube, e.g. in the form of a lacquer. This conductive material can be either a metal such as silver or carbon in the form of graphite or a semiconductor material such as silicon.

The portions of the layer 7 which are situated at the ends of the tube 6 are connected via rings 8 and 9 to the terminals of the electric current supply 5 which includes a shunt circuit whose ends are directly connected to the rings 8 and 9. This shunt circuit includes a capacitor 10 and a circuit-breaker 11 connected in series. A generator of electricity 12 is connected in parallel across the capacitor 10.

The laser amplifier illustrated in FIGS. 1 and 2 operates as follows.

When the circuit-breaker 11 is open, the capacitor 10 is charged by the generator 12 to a predetermined voltage. The circuit-breaker 11 is then closed. This causes a discharge current pulse to flow in the conductive layer 7 of the resistor 4.

The resistance of the layer 7 and the charging voltage of the capacitor 10 are chosen so that the energy released by the electric discharge is sufficient for the ionization around the resistance 4 to release ultra-violet radiation which excites the active gas contained in the chamber 1. This makes it possible to amplify a laser beam 13 at a wavelength of 1.315 microns which enters the chamber 1 via the window 2 and leaves it via the window 3.

As in practice the cross-section of the tube of the resistance 4 is very small relative to the cross-section of beam 13 in the chamber, this tube constitutes only a negligible impedance to the propagation of the beam 13 in the amplifier.

It is observed that the resistance 4 suffers only a small extent of damage due to the flow of the electric discharge current. This is not detrimental to its subsequent operation.

By way of indication, the insulating tube of this resistance is made of alumina and its outer diameter may be 3 to 4 mm, while its length may be about 60 cm; the conductive layer deposited on this tube is a silver lacquer which is about one tenth of a millimeter thick. With a capacitor charging voltage of 25 to 30 kV, the thin film resistance can withstand thirty or so discharges of 5 kilojoules each without completely disintegrating.

Figure 3:
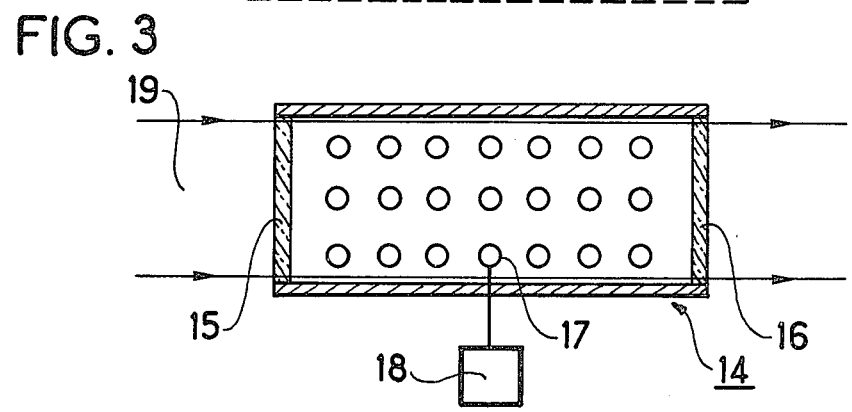
FIG. 3 illustrates diagrammatically another embodiment of a laser amplifier in accordance with the invention, a longitudinal cross-section of the chamber of the amplifier being shown.

FIG. 3 illustrates another embodiment of an amplifier in accordance with the invention. This amplifier also includes a cylindrical chamber 14 closed by two windows 15 and 16. A plurality of electric resistances such as 17, analogous to the previously described resistance 4, are disposed in the chamber 14 and lie parallel to the windows 15 and 16. Each resistance is connected to an electricity supply such as 18 analogous to the supply 5 in FIG. 1. Of course, the electricity supplies may be controlled by a programming device (not shown) which is capable of synchronizing the electric discharges in the various resistances with the passage of the laser beam 19 to be amplified. The operation of the amplifier illustrated in FIG. 3 is quite analogous to that illustrated in FIGS. 1 and 2.

An amplifier in accordance with the present invention can be applied to producing iodine laser generators.

Liquid dye amplifiers in accordance with the invention can also be produced, the resistances then being situated near the tank which contains the active medium.

Lastly, it is also possible to produce carbon dioxide or chemical laser amplifiers in accordance with the invention; the resistances are disposed preferably outside the chamber and the ultra-violet radiation released by the electric discharge serves only to preexcite the active medium.

We claim:

1. A laser amplifier including a fluid active medium, at least one electric resistance comprising an insulating support and a thin film layer of conductive material deposited on said support, a generator connected to the resistance, said generator comprising means for supplying and electrical discharge current pulse sufficiently high to produce ultra-violet radiation around said resistance of a level capable of exciting the active medium, two portions of said layer being connected to said electrical discharge current pulse supplying means of said generator said electric discharge current pulse being of short duration so as to hold the damage to the resistance due to the flow of the electrical discharge current pulse to such a small extent that it is not detrimental to subsequent re-use for subsequent excitation of the active medium.

2. A laser amplifier according to claim 1, wherein the conductive material is a conductive metal.

3. A laser amplifier according to claim 1, wherein the conductive material is carbon.

4. A laser amplifier according to claim 1, wherein the conductive material is a semi-conductive substance.

5. A laser amplifier according to claim 4, wherein the semi-conductive substance is silicon.

6. A laser amplifier according to claim 1, wherein the insulating support is a cylindrical tube, the layer being deposited on the outer surface of the tube.

7. A laser amplifier according to claim 6, wherein the cylindrical tube is made of a ceramic substance.

8. A laser amplifier according to claim 1, wherein the active substance is an iodized gas and the electric resistance is placed in the active medium.

* * * * *